United States Patent [19]

Fay et al.

[11] Patent Number: 5,190,571
[45] Date of Patent: Mar. 2, 1993

[54] DIESEL PARTICULATE TRAP BASED ON A MASS OF FIBROUS FILTER MATERIAL FORMED WITH LONGITUDINAL TUNNELS FILLED WITH FLEXIBLE STRANDS

[75] Inventors: William T. Fay, St. Paul; Edward M. Fischer, White Bear Lake; Stephen M. Sanocki, Stillwater, all of Minn.

[73] Assignee: Minnesota Mining and Manufacturing Company, St. Paul, Minn.

[21] Appl. No.: 891,642

[22] Filed: May 29, 1992

[51] Int. Cl.$^5$ .............................................. B01D 46/00
[52] U.S. Cl. ....................................... 55/523; 55/527; 55/DIG. 30
[58] Field of Search ................. 55/523, 527, DIG. 30; 60/311

[56] References Cited

U.S. PATENT DOCUMENTS

| | | | |
|---|---|---|---|
| 4,324,572 | 4/1982 | Erdmannsdorfer et al. | 55/385 |
| 4,398,931 | 8/1983 | Shevlin | 55/523 X |
| 4,543,113 | 9/1985 | Forester et al. | 55/378 |
| 4,613,350 | 9/1986 | Forester et al. | 65/2 |
| 4,798,615 | 1/1989 | Fukuta et al. | 55/523 X |
| 4,813,231 | 3/1989 | Bykowski | 55/523 X |
| 4,940,476 | 7/1990 | Buck | 55/486 |
| 5,141,641 | 8/1992 | Burgess | 210/483 |

FOREIGN PATENT DOCUMENTS 3545762  7/1987  Fed. Rep. of Germany .
3731766  3/1989  Fed. Rep. of Germany .
3801634  8/1989  Fed. Rep. of Germany .
3806131  8/1989  Fed. Rep. of Germany .

OTHER PUBLICATIONS

"Experiences in the Development of Ceramic Fiber Coil Particulate Traps," SAE Technical Paper Series, 870015, Hardenberg et al., 1987, pp. 67–78.

Primary Examiner—Charles Hart
Attorney, Agent, or Firm—Gary L. Griswold; Walter N. Kirn; Gerald F. Chernivec

[57] ABSTRACT

A diesel particulate trap has a filtering element which is a mass of fibrous filter material that radially fills a tubular casing. The filtering element employs lofty yarn extending in straight lines in a repeating pattern, which lines of lofty yarn have been compacted to form a plurality of fibrous walls that intersect to form tunnels extending in the axial or longitudinal direction of the casing. Some of the tunnels are filled with plugs that afford structural integrity while others of the tunnels remain open. The ends of the filtering element are covered by endplates. Substantially one-half of the open tunnels are axially aligned with openings in the inlet endplate and with imperforate areas in the outlet endplate, and the other open tunnels are axially aligned with openings in the outlet endplate and with imperforate areas in the inlet endplate. Exhaust gases entering tunnels open to the inlet pass through the compact fibrous walls and exit through tunnels open to the outlet.

14 Claims, 3 Drawing Sheets

DIESEL PARTICULATE TRAP BASED ON A MASS OF FIBROUS FILTER MATERIAL FORMED WITH LONGITUDINAL TUNNELS FILLED WITH FLEXIBLE STRANDS

BACKGROUND OF THE INVENTION

1. Field of the Invention

The invention concerns diesel particulate traps and is particularly concerned with making them more economical to manufacture and use, more efficient, and more durable.

2. Description of the Related Art

Diesel engines emit a sooty exhaust that can be rendered less hazardous by diesel particulate traps, but few such engines are so equipped. Known diesel particulate traps unduly increase fuel consumption, tend to be inefficient, and have short useful lives.

There are four main types of diesel particulate traps, each of which can have an elongated tubular casing and means for connecting the ends of the casing into an exhaust system. Of those:

- a first type employs a ceramic wallflow monolith such as is described in Offenlegungsschrift No. DE 38 06 131 (Giebling) that was laid open Aug. 31, 1989;
- a second type employs a rigid ceramic foam such as are shown in U.S. Pat. Nos. 4,264,346 (Mann) and 4,813,231 (Bykowski);
- a third type employs one or more rigid, hollow, perforated, metal tubes such as shown in U.S. Pat. No. 4,324,572 (Erdmannsdoerfer); and
- a fourth type employs a mass of fibrous filter material.

Each type can be periodically regenerated during use by burning off the collected particulate matter.

In a diesel particulate trap of the fourth type shown in FIGS. 1 and 2 of Offenlegungsschrift No. 35 45 762 (Brich) which was laid open Feb. 7, 1987, a ceramic fiber mat and a metallic web are spirally wound to provide a filtering element in the form of a mass of fibrous filter material that radially fills a tubular casing. That casing plus inlet and outlet cones provide a canister for the diesel particulate trap. Inlet and outlet endplates have openings that are axially offset so that exhaust gases flow radially outwardly through the filtering element. As is discussed in the Brich Offenlegungsschrift, exhaust gases can produce fiber shedding of fibrous filter material and consequently an undesirably shortened useful life, but this is said to be minimized by interleaving a ceramic fiber mat with a metallic mat so that the two become intermeshed.

Also of the fourth type is the diesel particulate trap of Offenlegungsschrift No. DE 38 01 634 (Stoepler et al.) that was laid open Aug. 3, 1989. The filtering element of its FIGS. 1 and 2 consists of a filter material (12) sandwiched between two perforated metal sheets (13) and (14) that can instead be metallic weaves. The filter material (12) can be a metallic weave or ceramic fibers in the form of a nonwoven mat, a woven structure, or a blanket- or felt-like structure. The sandwich is spirally wound together with corrugated sheets (15) that provide spiral inlet and outlet channels between adjacent convolutions of the filter material, thus providing a filtering element in the form of a mass of fibrous filter material that radially fills a tubular casing.

SUMMARY OF THE INVENTION

The invention provides a fourth type of diesel particulate trap which, as compared to those of the above-cited Brich and Stoepler patent publications, should be more economical to manufacture while being at least as efficient as any in the prior art. Briefly, the novel diesel particulate trap, like that of Brich, can have

- a tubular casing having an inlet and an outlet;
- means for connecting the inlet and outlet of the casing into an exhaust system;
- a filtering element in the form of a mass of fibrous filter material that radially fills the casing; and
- inlet and outlet endplates that cover the ends of the filtering element, each endplate being formed with openings that are axially aligned with imperforate areas of the other endplate, thus affording both radial and axial components to exhaust gases flowing through the filtering element.

The diesel particulate trap of the invention differs from that of Brich in that:

- the mass of fibrous filter material comprises lofty yarn extending in straight lines in a repeating pattern, which lines of lofty yarn have been compacted to form a plurality of coextensive, compact, porous, fibrous walls, each extending substantially parallel to the axis of the casing and intersecting others of the walls to define a plurality of uniform tunnels that extend through said mass in the direction of the axis of the casing;
- each of a plurality of the tunnels is filled with a plug that prevents exhaust gases from flowing through its tunnel without being filtered; and
- a plurality of the tunnels are open, each open tunnel being axially aligned with an opening in one endplate and with an imperforate area of the other endplate, so that exhaust gases entering the open tunnels are filtered by passing through compact fibrous walls before reaching the outlet.

By "lofty" is meant a yarn which when unstressed has a voids volume of at least 85%. The voids volume of a yarn can be calculated by using a graduated microscope to measure the nominal diameter (D) and a scale to measure the mass (M) of a length (L) of the yarn. The voids volume (VV) is then obtained from the following equation:

$$VV = 1 - \frac{M/\rho}{\pi L D^2 /4}$$

wherein $\rho$ is the bulk density of the yarn.

A yarn can be made lofty by air-texturizing. When the yarn is a continuous-filament yarn, the texturizing causes loops of the continuous filaments to extend outwardly, without substantial breakage. A spun staple glass or ceramic yarn also can be texturized, substantially without breaking filaments.

The D of a texturized yarn is the diameter of a cylindrical envelope to which the loops extend, which envelope bridges any valleys at the surface of the yarn and so encompasses voids at those surfaces.

To enhance texturizing, individual ends of the fill yarns should not be highly twisted, i.e., they preferably have less than 2 twists/m, and the ends should not be tightly twisted together, i.e., preferably having no more than one twist/cm. When the ends are twisted together, texturizing also is enhanced by employing only a few ends per yarn, preferably two or three.

By employing texturized yarn to form the compact fibrous walls of the mass of fibrous filter material of the novel diesel particulate trap, the filtering element should have a voids volume of at least 70%, even when the plugs are dense. By using porous plugs, there should be no difficulty in attaining desirably higher voids volumes of at least 80%, more preferably at least 85%, while also attaining excellent structural integrity. Higher voids volumes help both to reduce the back pressure and to prolong times between successive regenerations. The voids volume of the filtering element can be readily calculated from its volume and weight and the average density of the materials used in making it.

The plugs can be so dense that they virtually block exhaust, but they preferably are lofty yarn that is not packed into the tunnels more tightly than is necessary to ensure against being loosened by the forces of the exhaust gases. Lofty plugs help to filter exhaust gases, thus extending the length of times between the need for periodic regeneration. Lofty plugs also help to reduce back pressure and to increase particle capacity before regeneration is necessary.

Among useful plug materials are various fibrous materials and ceramic and glass rods, preferably rods of open-cell foams that have a filtering function.

When the plugs comprise yarns, each yarn can be trimmed off at the ends of each tunnel, or a yarn can extend from a tunnel through an axially aligned opening in one of the endplates, across an imperforate area of the endplate, and back through a second tunnel that is axially aligned with the different opening. The yarn then can be trimmed off at the end of the second tunnel, or it can continue across an imperforate area of the other endplate and back through a third tunnel. Such lacing can be made easier to perform by using braided yarns. Lacing safeguards against dislodgement of the plugs and can help to secure the endplates to the mass of elongated filter material.

Both the plugs and the yarn of the fibrous walls preferably are yarns of inorganic filaments or fibers. The term "yarn" is used here to encompass bundles of ends that have been twisted together as well as to encompass bundles of ends that have not been twisted together, even though a bundle of untwisted ends often is called a "roving" in the art.

When the novel diesel particulate trap is to be subjected to temperatures above 550° C., the yarns preferably are primarily ceramic. When it is to be subjected to temperatures from about 330° C. to 550° C., costs can be reduced by employing yarns that are either hybrid ceramic/glass or special high-temperature-resistant glass such as a leached glass or "S-2" glass from Owens Corning. When it is to be subjected to temperatures not exceeding 330° C., costs can be further reduced by employing yarns that are ordinary glass.

To afford long life to the novel diesel particulate trap, both the plugs and the yarn of the fibrous walls preferably are a continuous-filament yarn such as a continuous-filament glass or ceramic yarn. Other preferred yarns include spun staple yarn, especially spun staple glass or ceramic yarn. A continuous-filament ceramic yarn that has good strength and excellent resistance to temperatures above 1200° C. is a yarn of alumina-boria-silica. Such a yarn is available commercially as NEXTEL ™ 312 or 440 ceramic yarn from 3M Co.

Yarns used for the fibrous walls and/or as the plugs of the novel diesel particulate trap can also include metal filaments. To permit the diesel particulate trap to be regenerated electrically, the metal filaments can afford electrical resistance heating.

Preferably, substantially one-half of the open tunnels are axially aligned with openings in the inlet endplate and with imperforate areas in the outlet endplate, the other open tunnels are axially aligned with openings in the outlet endplate and with imperforate areas in the inlet endplate, and exhaust gases entering tunnels open to the inlet pass through compact fibrous walls and exit through tunnels open to the outlet.

Preferably the ratio of open to filled tunnels is from 1:2 to 2:1, ideally from about 1:1 to 1.2:1. Because the filled tunnels tend to stabilize the open tunnels, substantially higher ratios might result in poor integrity and a consequent reduction in useful life of the novel diesel particulate trap. On the other hand, substantially lower ratios might result in undesirably high back pressures.

To keep back pressures desirably low, the endplates should have a high percentage of openness, preferably at least 30% and more preferably at least 50%.

Among other techniques for reducing back pressures while retaining good structural integrity is to incorporate into yarn of the fibrous walls and/or plugs ceramic blown microfibers such as alumina-boria-silica blown microfibers that are available commercially as ULTRAFIBER ™ 312 or 440 from 3M Co. Because of their fineness and consequently large surface area, such microfibers also enhance filtration. Because they might involve a health hazard if blown into the atmosphere, care should be taken to prevent them from becoming dislodged, e.g., by incorporating them into continuous-filament yarns.

Back pressures also can be reduced when yarn of the fibrous walls and/or plugs incorporates heat-fugitive fibers in amounts up to about 25% by volume of total fibrous material. After constructing the novel diesel particulate trap, the heat-fugitive fibers are burned off, either during the manufacturing process or in its first use. Doing so heat sets fibers that are primarily glass or ceramic, thus making them hold their shape in spite of passageways created by burning off the heat-fugitive fibers. Such passageways additionally afford enhanced exhaust access to the filtering fibers.

BRIEF DESCRIPTION OF THE DRAWING () The invention may be more easily understood in reference to the drawing, all figures of which are schematic. In the drawing.

DESCRIPTION OF THE PREFERRED EMBODIMENTS

Figure 1:
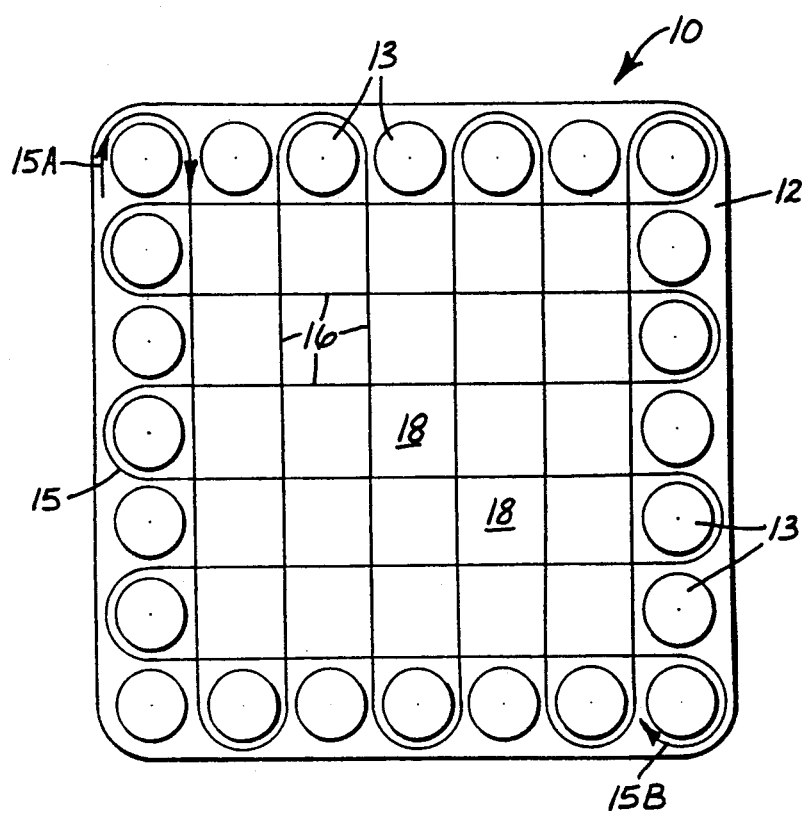
FIG. 1 is a plan view of a jig and its use for producing a filtering element for a diesel particulate trap of the invention.

The jig 10 of FIG. 1 consists of a rectangular frame 12 from which twenty-four pins 13 project. Shown being wound around the pins is a lofty yarn 15. After completing the illustrated checkerboard pattern of straight lines (from arrow 15A to arrow 15B), the pattern is repeated many times except that each layer uses pins that were not used in the preceding layer. Successive repetitions of the pattern are compacted in the direction parallel to the axes of the pins 13, thus gradually building a coherent mass of fibrous filter material that holds its shape when removed from the jig. The coherent fibrous mass includes a fibrous wall 16 of appreciable thickness comprising each row of compacted straight lines of the lofty yarn. Between the walls is a 5-by-5 rectangular array of uniform tunnels 18.

Figure 2:
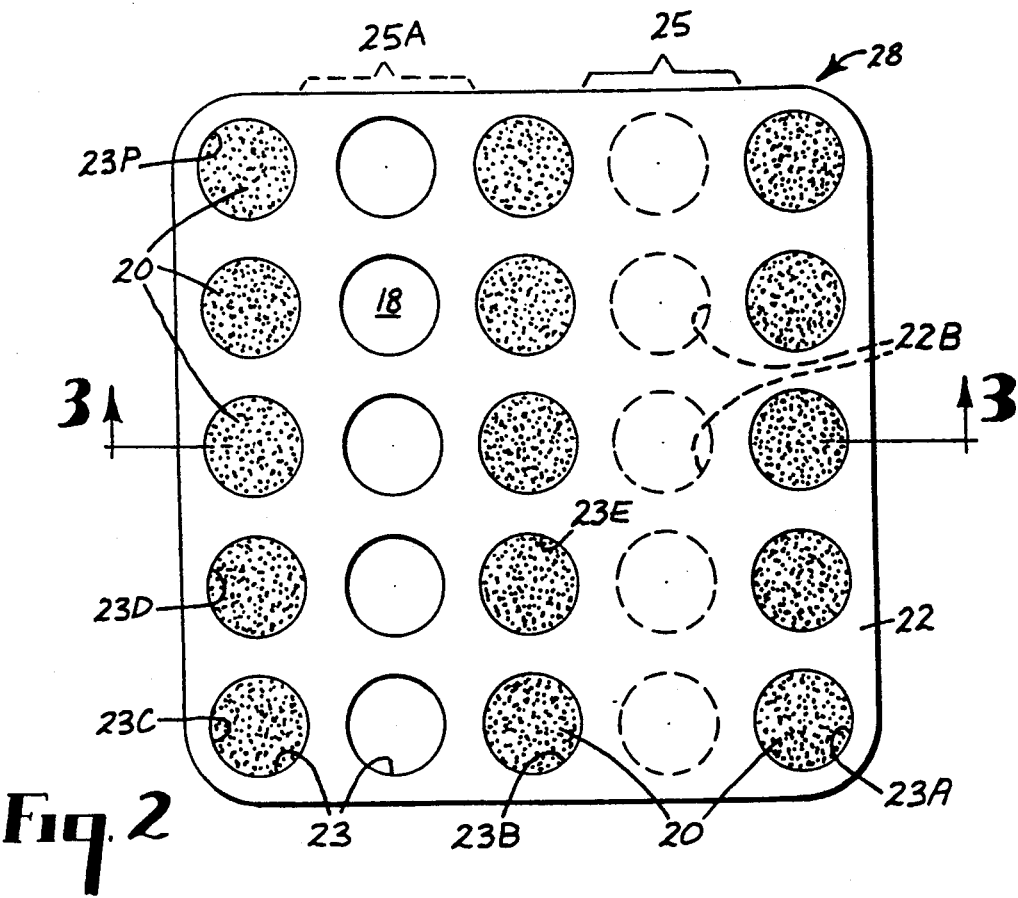
FIG. 2 is an end view of a filtering element (shown enlarged) that has been made using the fibrous mass produced in FIG. 1.

As shown in FIG. 2, a bulky yarn or bundle of yarns has been pulled through each of three rows of the tunnels and trimmed to be coextensive with the length of each tunnel, thus leaving an axial yarn plug 20 in each of fifteen of the tunnels. One end of the mass of fibrous filter material is then covered with a first rectangular endplate 22 that is formed with four rows of five circular openings 23 and an imperforate area 25 bridging two of the rows. Each of the openings is axially aligned with one of the tunnels 18. The diameter of each of the circular openings about equals the breadth of a tunnel 18.

An identical second rectangular endplate 22A (shown in FIG. 3) is rotated 180° with respect to the first endplate and placed at the other end of the filtering element so that each of its openings is axially aligned with one of the tunnels 18. In doing so, one row of its openings 22B is axially aligned with the imperforate area 25 of the first endplate 22, and one row of the openings 23 of the first endplate is axially aligned with an imperforate area 25A of the second endplate 22A. While so positioned, the two endplates are sealed to a rectangular metal sleeve 26 (shown in FIG. 3). The resulting filtering element 28 is rectangular even though every prototype diesel particulate trap of the invention has had a filtering element that is substantially cylindrical.

If desired, each of the yarn plugs 20 could be provided by a single braided yarn (not shown) that is pulled through the lower left tunnel until its end is at the plane of the hidden endplate. The braided yarn emerges from the circular opening 23A of the first endplate 22, extends across the imperforate area 25 and into a circular opening 23B, through its tunnel, across the imperforate area 25A of the hidden endplate and up through a third circular opening 23C. The braided yarn then crosses a narrow imperforate area of the first endplate 22 and enters a fourth circular opening 23D to be pulled back across the imperforate area 25A of the hidden endplate and up through a fifth circular opening 25E, and so on until being cut off where it emerges from the fifteenth yarn-filled circular opening 23P of the first endplate 22.

Figure 3:
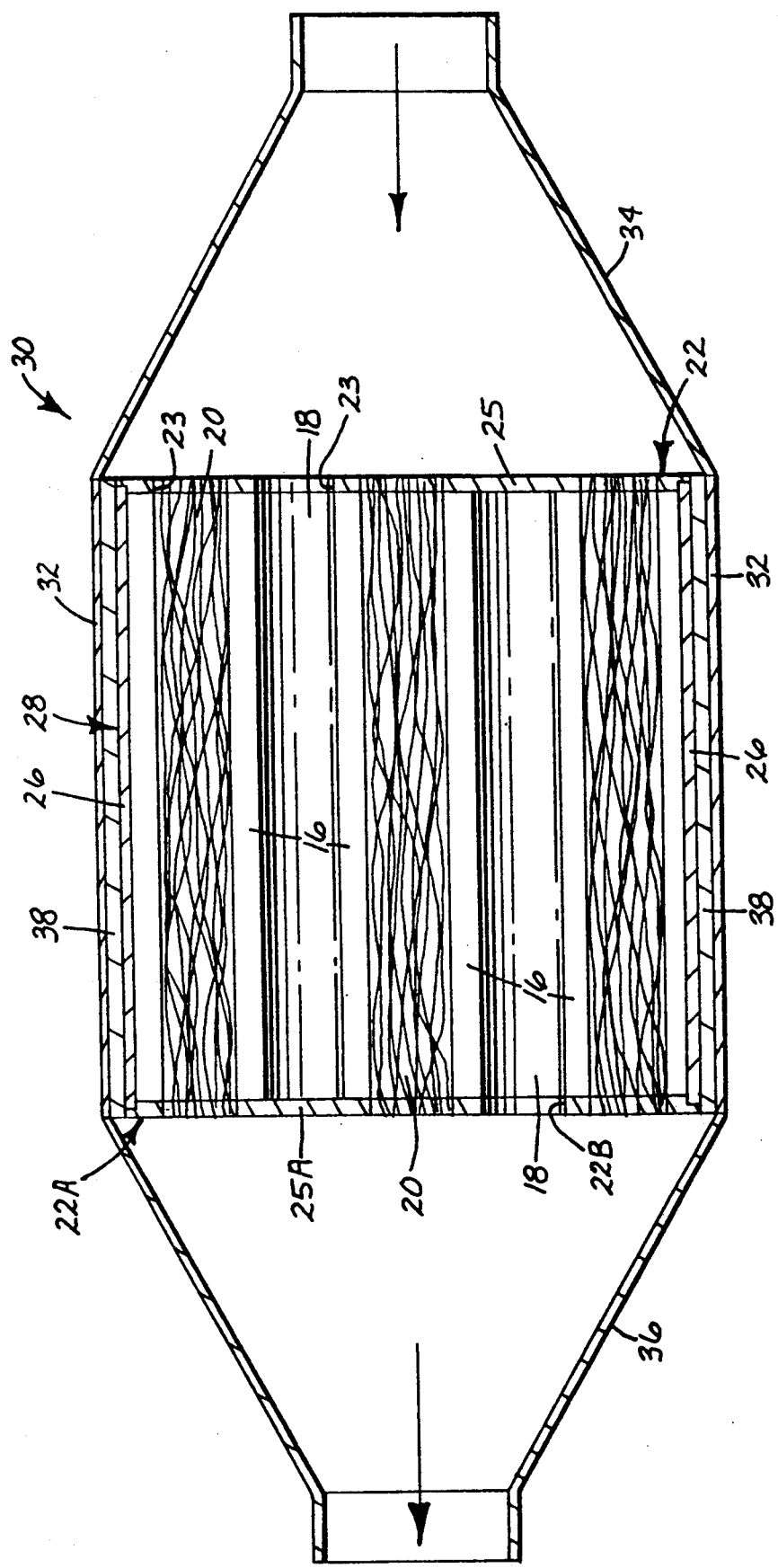
FIG. 3 is a central cross section through a diesel particulate trap that incorporates the filtering element of FIG. 2, taken along line 3—3 of FIG. 2.

In FIG. 3, the filtering element 28 is shown installed in a diesel particulate trap 30 which has a canister of rectangular tubular casing 32, a pyramidal exhaust inlet 34, and a pyramidal exhaust outlet 36. As installed, the walls 16 and tunnels 18 extend in the axial or longitudinal direction of the filtering element which is also the primary direction of the flow of exhaust through the diesel particulate trap. The metal sleeve 26 of the filtering element has been sealed to the casing 32 by an intumescent mat 38 that expands when exposed to the heat of the first use of the diesel particulate trap. Any such mat should be selected to withstand temperatures encountered in use, especially temperatures at which the filtering element is to be regenerated. A particularly useful intumescent mat is provided by a heat-expandable vermiculite mat, e.g., INTERAM TM 2600, Series I from 3M.

In operation, exhaust entering the inlet 34 passes
1) through the row of unblocked openings 23 of the first endplate 22 into aligned open entrance tunnels 18 which are blocked by the imperforate area 25A of the second endplate 22A,
2) radially through walls 16, and
3) through open exit tunnels 18 and openings 22B of the second endplate 22A that are axially aligned with the imperforate area 25 of the first endplate 22.

Figure 4:
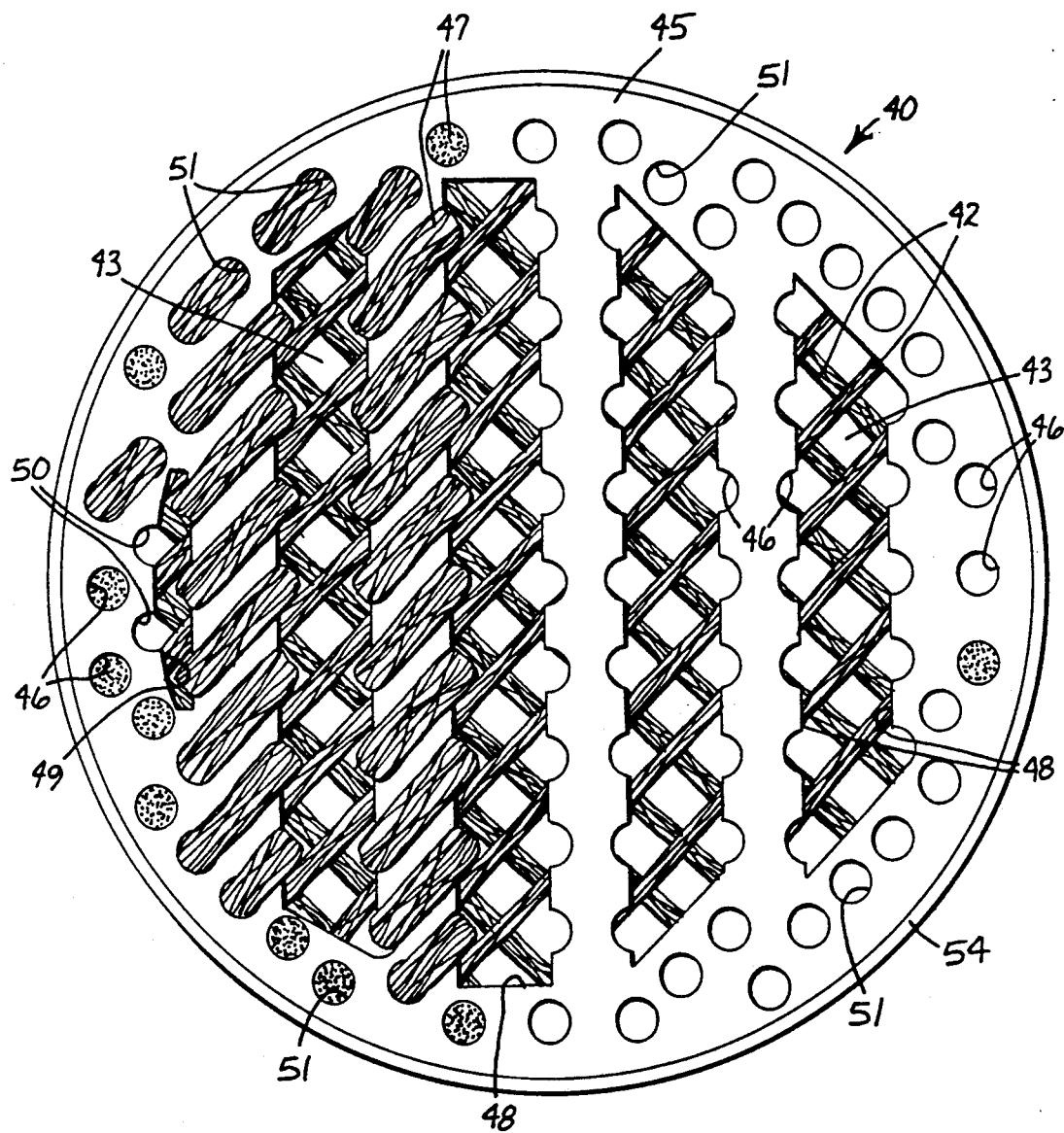
FIG. 4 is an end view of a second filtering element (partially showing the braided yarn pattern) that can be used to make a second diesel particulate trap of the invention.

Although the diesel particulate trap 30 of FIG. 3 makes inefficient use of its filtering element 28, it will be appreciated by those skilled in the art that a greater proportion of tunnels should be free from axials and located adjacent the periphery of the filtering element (as in FIG. 4). Furthermore, even though openings in the endplates can have the same size as the tunnels, they preferably are larger to reduce back pressure (as in FIG. 4).

Shown in FIG. 4 is a filtering element 40 which is cylindrical in shape and has been made with straight lines of lofty yarn to have a checkerboard pattern of compact fibrous walls 42 that define axial tunnels 43. The first endplate 45 for the filtering element 40 was made from an imperforate circular plate into which were drilled first circular openings 46, each to be axially aligned with an axial tunnel to receive a braided yarn 47. The first endplate was then cut away along the diameters of parallel rows of first circular openings 46 to form four slots 48, so that a row of the open tunnels 43 extends lengthwise from the center line of each slot. A fifth slot 49 opens the first endplate at two additional open tunnels 50. Second circular openings 51 were drilled near the perimeter of the endplate 45 to receive braided yarn that forms fibrous plugs to enhance the stability of the filtering element.

While the first endplate 45 is shown at one end of the filtering element 40, an identical second endplate (not shown) has been rotated 180° with respect to the first endplate and placed at the other end of the filtering element so that each of its slots is axially aligned with one of the imperforate areas between the slots of the first endplate 45. Hence, each of the open tunnels 43 is axially aligned with an opening in one endplate and an imperforate area of the other endplate. A cylindrical metal sleeve 54 is sealed to the endplates to enclose the filtering element 40.

EXAMPLE 1

A prototype diesel particulate trap was made with a filtering element substantially as illustrated in FIG. 4 except that the endplates were not cut away to form the slots 48 and 49. Significant features of the prototype diesel particulate trap were:

| filtering element | |
| --- | --- |
| length | 7.63 cm |
| diameter | 14.92 cm |
| wall spacing | 6.35 mm center-to-center |
| voids volume | 83.6% |
| endplates | 304 stainless steel, 1.6 mm thick |
| circular openings | 6.35 mm diameter |
| sleeve | 304 stainless steel, 1.6 mm thick |
| lofty yarn | continuous-filament ceramic yarn (NEXTEL TM 312) |

| | |
|---|---|
| construction | 1800 denier, 780 filaments, 2/2, 0.6 tw/cm, texturized yarn |
| no. yarns/bundle | 4 |
| plugs | continuous-filament ceramic yarn (NEXTEL ™ 312) |
| construction | 1800 denier, 780 filaments, 2/2, 0.2 tw/cm, texturized yarn |
| no. yarns/plug | 20 |

This filtering element was mounted in a canister in the same manner as is shown in FIG. 3. The canister was then connected to the exhaust from a 3.4-liter Cummins diesel engine set at the following conditions: engine speed 2100 rpm, hydraulic pump load 800 psi (5500 kPa). The pressure drop across the clean filter at 3.4 m³/min. of air was 96.5 cm of water. After 90 minutes, the canister was removed.

| | |
|---|---|
| average efficiency | 76% |
| soot collected | 4.4 g |

EXAMPLE 2

A prototype diesel particulate trap was made as described in Example 1 except as follows:

| filtering element | |
|---|---|
| length | 15.26 cm |
| voids volume | 85.5% |
| lofty yarn construction | 0.2 tw/cm |

This was tested as in Example 1 with the following results:

| | |
|---|---|
| clean pressure drop | 94 cm of water |
| average efficiency | 64% |
| soot collected | 4.3 g |

EXAMPLE 3

A prototype diesel particulate trap was made and tested as described in Example 1 except as follows:

| filtering element | |
|---|---|
| length | 15.26 cm |
| voids volume | 86.6% |
| plugs construction | 0.6 tw/cm |
| clean pressure drop | 127 cm of water |
| average efficiency | 86% |
| soot collected | 5.6 g |

EXAMPLE 4

A prototype diesel particulate trap was made and tested as described in Example 1 except that its endplates were as illustrated in FIG. 4 and other differences were:

| filtering element | |
|---|---|
| voids volume | 82.7% |
| plugs | braided yarn, ID = 1.3 cm |
| construction | |
| time of testing | 60 minutes |
| clean pressure drop | 81 cm of water |
| average efficiency | 76% |
| soot collected | 3 g |

Like most prior diesel traps, that of the invention can incorporate means for periodic burn-off of accumulated particulates, e.g., by periodically heating the exhaust to a temperature above the combustion point of the deposited particulate matter. Preliminary prototype testing of the novel diesel particulate trap indicates that combustion adequately cleans the filtering element without any apparent damage. Useful electrical combustion techniques are taught in European patent application, Publ. No. 0,275,372 (Gurtler et al.) which was laid open Jan. 3, 1990.

The tubular casing of the novel diesel particulate trap preferably is sheet metal, especially stainless steel in order to afford reasonably long life. For economy in construction, the casing preferably is circular or elliptical in cross section, and can be elongated to allow it to have a slim profile.

What is claimed is:

1. A diesel particulate trap comprising
    a tubular casing having an inlet and an outlet;
    means for connecting the inlet and outlet of the casing into an exhaust system;
    a filtering element in the form of a mass of fibrous filter material that radially fills the casing and comprises lofty yarn extending in straight lines in a repeating pattern, which lines of lofty yarn form a plurality of coextensive, compact, porous fibrous walls, each extending substantially parallel to the axis of the casing and intersecting others of the walls to define a plurality of uniform tunnels that extend through said mass in the direction of the axis of the casing;
    inlet and outlet endplates that cover the ends of the filtering element, each endplate being formed with openings, at least some of which are axially aligned with imperforate areas of the other endplate,
    a plug filling each of a plurality of the tunnels and preventing exhaust gases from flowing through its tunnel without being filtered; and
    a plurality of the tunnels being open, each open tunnel being axially aligned with an opening in one endplate and with an imperforate area of the other endplate, so that exhaust gases entering the open tunnels are filtered by passing through compact fibrous walls before reaching the outlet.

2. A diesel particulate trap as defined in claim 1 wherein substantially one-half of the open tunnels are axially aligned both with openings in the outlet endplate and with imperforate areas in the inlet endplate, the other open tunnels are axially aligned both with openings in the inlet endplate and with imperforate areas in the outlet endplate, and exhaust gases entering tunnels open to the inlet pass through the compact fibrous walls and exit through tunnels open to the outlet.

3. A diesel particulate trap as defined in claim 1 wherein individual ends of the lofty yarn have less than 2 twists/m, and the ends are not more tightly twisted together than one twist/cm.

4. A diesel particulate trap as defined in claim 3 wherein the yarn is texturized.

5. A diesel particulate trap as defined in claim 1 wherein the filtering element has a voids volume of at least 70%.

6. A diesel particulate trap as defined in claim 5 wherein each plug has a voids volume of at least 70%.

7. A diesel particulate trap as defined in claim 1 wherein the plugs comprise yarn.

8. A diesel particulate trap as defined in claim 5 wherein each of the lofty yarn of the walls and the yarn of the plugs is selected from continuous-filament glass or ceramic yarn and spun staple glass or ceramic yarn.

9. A diesel particulate trap as defined in claim 8 wherein each of the lofty yarn of the walls and the yarn of the plugs comprises alumina-boria-silica.

10. A diesel particulate trap as defined in claim 8 wherein at least one of the yarn of the walls and the plug comprises ceramic blown microfibers.

11. A diesel particulate trap as defined in claim 7 wherein at least one of the yarn of the walls and the plug further comprises heat-fugitive fibers in amounts up to about 25% by volume of total fibrous material.

12. A diesel particulate trap comprising
a tubular casing;
means for connecting the ends of the casing into an exhaust system;
a filtering element in the form of a mass of fibrous filter material that radially fills the casing; and
inlet and outlet endplates that cover the ends of the filtering element, each endplate being formed with openings that are axially aligned with imperforate areas of the other endplate, thus affording both radial and axial components to exhaust gases flowing through the filtering element;
which diesel particulate trap is characterized by the feature that:
the mass of fibrous filter material comprises lofty yarn extending in straight lines in a repeating pattern, which lines of lofty yarn form a plurality of coextensive, compact, porous fibrous walls, each extending substantially parallel to the axis of the casing and intersecting others of the walls to define a plurality of uniform tunnels that extend through said mass in the direction of the axis of the casing;
each of a plurality of the tunnels is filled with a plug that prevents exhaust gases from flowing through its tunnel without being filtered; and
a plurality of the tunnels are open, each open tunnel being axially aligned with an opening in one endplate and with an imperforate area of the other endplate, so that exhaust gases entering the open tunnels are filtered by passing through compact fibrous walls before reaching the outlet.

13. A diesel particulate trap as defined in claim 12 wherein the filtering element has a voids volume of at least 70%.

14. A diesel particulate trap as defined in claim 13 wherein the voids volume of the filtering element is at least 85%.

* * * * *